United States Patent
Chen

(10) Patent No.: US 9,739,897 B2
(45) Date of Patent: Aug. 22, 2017

(54) LANTHANUM-YTTRIUM OXIDE SCINTILLATORS AND USE THEREOF

(71) Applicant: THE BOARD OF REGENTS, THE UNIVERSITY OF TEXAS SYSTEM, Austin, TX (US)

(72) Inventor: Wei Chen, Arlington, TX (US)

(73) Assignee: Board of Regents, the University of Texas System, Austin, TX (US)

( * ) Notice: Subject to any disclaimer, the term of this patent is extended or adjusted under 35 U.S.C. 154(b) by 12 days.

(21) Appl. No.: 14/907,601

(22) PCT Filed: Jul. 29, 2014

(86) PCT No.: PCT/US2014/048566
§ 371 (c)(1),
(2) Date: Jan. 26, 2016

(87) PCT Pub. No.: WO2015/017384
PCT Pub. Date: Feb. 5, 2015

(65) Prior Publication Data
US 2016/0178761 A1 Jun. 23, 2016

Related U.S. Application Data

(60) Provisional application No. 61/859,466, filed on Jul. 29, 2013.

(51) Int. Cl.
*G01T 1/202* (2006.01)
*C09K 11/77* (2006.01)
*G01T 1/20* (2006.01)
*G21K 4/00* (2006.01)

(52) U.S. Cl.
CPC ........ *G01T 1/2023* (2013.01); *C09K 11/7787* (2013.01); *G01T 1/202* (2013.01); *G01T 1/2018* (2013.01); *G21K 4/00* (2013.01)

(58) Field of Classification Search
CPC ..... G01T 1/2023; G01T 1/202; G01T 1/2018; C09K 11/7787; G21K 4/00
See application file for complete search history.

(56) References Cited

U.S. PATENT DOCUMENTS

| 4,211,758 A | 7/1980 | Buhrer |
| 5,213,712 A | 5/1993 | Dole |
| 6,946,300 B2 * | 9/2005 | Nguyen ................. G01N 1/24 356/36 |

(Continued)

FOREIGN PATENT DOCUMENTS

CN  101665696 B  *  8/2012

OTHER PUBLICATIONS

Machine English translation of CN 101665696 B.*

(Continued)

*Primary Examiner* — David Porta
*Assistant Examiner* — Mindy Vu
(74) *Attorney, Agent, or Firm* — Richard S. Echler; FisherBroyles, LLP

(57) ABSTRACT

The disclosure relates to lanthanum-yttrium oxide scintillators used for detecting radiation, such as X-rays, gamma rays and thermal neutron radiation and charged particles, in security, medical imaging, particle physics and other applications.

20 Claims, 11 Drawing Sheets

(56) References Cited

U.S. PATENT DOCUMENTS

2008/0213151 A1    9/2008    Yoshikawa et al.
2011/0024634 A1    2/2011    Shah et al.

OTHER PUBLICATIONS

Wei Chen et al., "Luminescence of La0.2Y1.8O3 nanostructured scintillators," Optics Letters, vol. 39, No. 19; pp. 5705-5708 (2014).
L. Zhou et al., "Sol-Gel Synthesis and Photoluminescence of RExLu2-xO3: Eu3+ (Re=Y, Gd) Nanophosphors," Inorganic materials, vol. 41, No. 6; pp. 613-617 (2005).
Yetta D. Porter-Chapman et al., "Systematic Search for New Lanthanum Scintillators," IEEE Nuclear Science Conference Record (2006).
Written Opinion of the International Searching Authority; PCT/US2014/048566, Issued Nov. 14, 2014.

* cited by examiner

US 9,739,897 B2

LANTHANUM-YTTRIUM OXIDE SCINTILLATORS AND USE THEREOF

CROSS REFERENCE TO RELATED APPLICATIONS

This application is a National Stage Entry of co-pending International Application No. PCT/US14/48566 filed Jul. 29, 2014, which claims the benefit of Provisional Application Ser. No. 61/859,466, filed on Jul. 29, 2013, the entire disclosure of which are incorporated herein by reference in their entirety.

FIELD

The disclosure relates to lanthanum-yttrium oxide scintillators used for detecting radiation, such as X-rays, gamma rays and thermal neutron radiation and charged particles, in security, medical imaging, particle physics and other applications.

BRIEF DESCRIPTION OF THE DRAWINGS

The following drawings illustrate by way of example and not limitation. For the sake of brevity and clarity, every feature of a given structure is not always labeled in every figure in which that structure appears.

DETAILED DESCRIPTION

Figure 1:
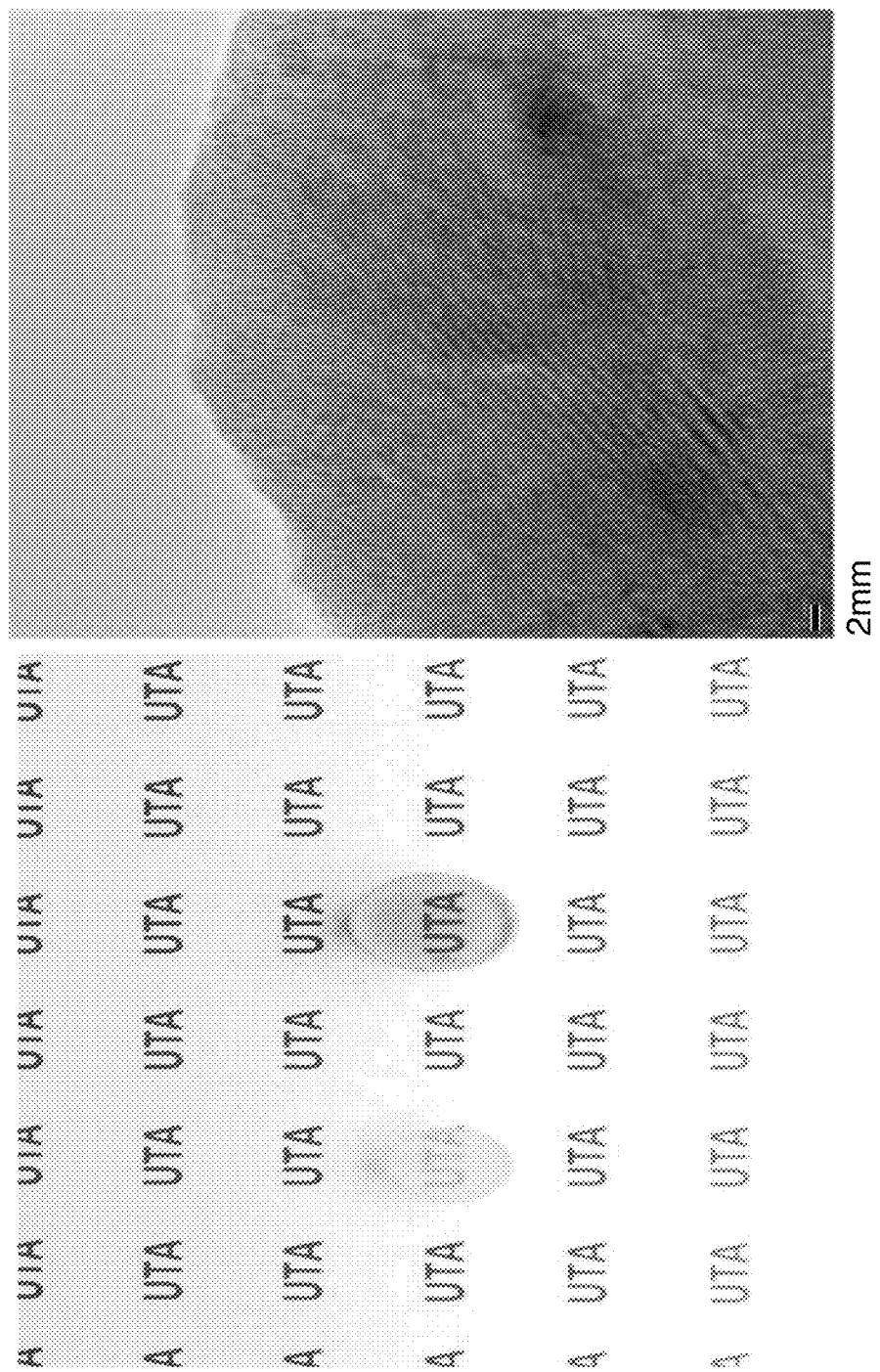
FIG. 1 depicts samples (left) and transmission electron microscopy (TEM) images of $La_{0.2}Y_{1.8}O_3$ (right). The size of the two samples on the left is about 1 cm and the particle size in the TEM image is about 50 nm.

The materials, scintillators, compositions, articles, and methods described herein may be understood more readily by reference to the following detailed description of specific aspects of the disclosed subject matter and the Examples included therein.

Before the present materials, scintillators, compositions, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

General Definitions

In this specification and in the claims that follow, reference will be made to a number of terms, which shall be defined to have the following meanings:

All percentages, ratios and proportions herein are by weight, unless otherwise specified. All temperatures are in degrees Celsius (° C.) unless otherwise specified.

The terms "a" and "an" are defined as one or more unless this disclosure explicitly requires otherwise.

Ranges may be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Values expressed as "greater than" do not include the lower value. For example, when the "variable x" is defined as "greater than zero" expressed as "0<x" the value of x is any value, fractional or otherwise that is greater than zero.

Similarly, values expressed as "less than" do not include the upper value. For example, when the "variable x" is defined as "less than 2" expressed as "x<2" the value of x is any value, fractional or otherwise that is less than 2.

"Optional" or "optionally" means that the subsequently described event or circumstance can or cannot occur, and that the description includes instances where the event or circumstance occurs and instances where it does not.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, an apparatus that "comprises," "has," "includes" or "contains" one or more elements possesses those one or more elements, but is not limited to possessing only those elements. Likewise, a method that "comprises," "has," "includes" or "contains" one or more steps possesses those one or more steps, but is not limited to possessing only those one or more steps.

Any embodiment of any of the apparatuses, systems, and methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

1. Scintillators

The disclosed methods utilize luminescent metal oxide scintillators comprising metals chosen from lanthanum (La), lutetium (Lu), scandium (Sc) or yttrium (Y), the disclosed scintillators having the Formula (I):

$$A_xB_{2-x}O_3 \quad (I)$$

wherein A is an element chosen from La, Y, Lu or Sc;
B is an element chosen from La, Y, Lu or Sc;
provided that A and B are not the same element;
the index x is greater than 0 and less than 2 (0<x<2).

The scintillators when prepared can have a particle size of from about 0.1 nm to about 500 nm. In one embodiment the disclosed scintillators are formed into a glass having a thickness and configuration determined by the formulator. The resulting glass can be adapted for use in the methods and devices described herein.

In one aspect the disclosed scintillators have the formula $La_xY_{2-x}O_3$ wherein the value of x is 0<x<2. Non-limiting examples of this aspect include: $La_{0.1}Y_{1.9}O_3$; $La_{0.2}Y_{1.8}O_3$; $La_{0.3}Y_{1.7}O_3$; $La_{0.4}Y_{1.6}O_3$; $La_{0.5}Y_{1.5}O_3$; and $La_{0.6}Y_{1.6}O_3$.

In a further aspect the disclosed scintillators have the formula $La_xY_{2-x}O_3$ wherein the value of x is 0<x<2. Non-limiting examples of this aspect include: $Lu_{0.1}Y_{1.9}O_3$; $Lu_{0.2}Y_{1.8}O_3$; $Lu_{0.3}Y_{1.7}O_3$; $Lu_{0.4}Y_{1.6}O_3$; $Lu_{0.5}Y_{1.5}O_3$; and $Lu_{0.6}Y_{1.4}O_3$.

In another aspect the disclosed scintillators have the formula $Sc_xY_{2-x}O_3$ wherein the value of x is 0<x<2. Non-limiting examples of the aspect include: $Sc_{0.1}Y_{1.9}O_3$; $Sc_{0.2}Y_{1.8}O_3$; $Sc_{0.3}Y_{1.7}O_3$; $Sc_{0.4}Y_{1.6}O_3$; $Sc_{0.5}Y_{1.5}O_3$; and $Sc_{0.6}Y_{1.4}O_3$.

In one aspect of the disclosed scintillators the index x is from 0.5 to 0.8. In another aspect the index x is from 0.01 to 0.1. As such, the value of the index x for the disclosed scintillators can, for example, 0.01, 0.011, 0.012, 0.013, 0.014, 0.015, 0.016, 0.017, 0.018, 0.019, 0.02, 0.021, 0.022, 0.023, 0.024, 0.025, 0.026, 0.027, 0.028, 0.029, 0.03, 0.031, 0.032, 0.033, 0.034, 0.035, 0.036, 0.037, 0.038, 0.039, 0.04, 0.041, 0.042, 0.043, 0.044, 0.045, 0.046, 0.047, 0.048, 0.049, 0.05, 0.051, 0.052, 0.053, 0.054, 0.055, 0.056, 0.057, 0.058, 0.059, 0.06, 0.061, 0.062, 0.063, 0.064, 0.065, 0.066, 0.067, 0.068, 0.069, 0.07, 0.071, 0.072, 0.073, 0.074, 0.075, 0.076, 0.077, 0.078, 0.079, 0.08, 0.081, 0.082, 0.083, 0.084, 0.085, 0.086, 0.087, 0.088, 0.089, 0.09, 0.091, 0.092, 0.093, 0.094, 0.095, 0.096, 0.097, 0.098, 0.099, 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.4, 0.41, 0.42, 0.43, 0.44, 0.45, 0.46, 0.47, 0.48, 0.49, 0.5, 0.51, 0.52, 0.53, 0.54, 0.55, 0.56, 0.57, 0.58, 0.59, 0.6, 0.61, 0.62, 0.63, 0.64, 0.65, 0.66, 0.67, 0.68, 0.69, 0.7, 0.71, 0.72, 0.73, 0.74, 0.75, 0.76, 0.77, 0.78, 0.79, 0.8, 0.81, 0.82, 0.83, 0.84, 0.85, 0.86, 0.87, 0.88, 0.89, 0.9, 0.91, 0.92, 0.93, 0.94, 0.95, 0.96, 0.97, 0.98, 0.99, 1.01, 1.011, 1.012, 1.013, 1.014, 1.015, 1.016, 1.017, 1.018, 1.019, 1.02, 1.021, 1.022, 1.023, 1.024, 1.025, 1.026, 1.027, 1.028, 1.029, 1.03, 1.031, 1.032, 1.033, 1.034, 1.035, 1.036, 1.037, 1.038, 1.039, 1.04, 1.041, 1.042, 1.043, 1.044, 1.045, 1.046, 1.047, 1.048, 1.049, 1.05, 1.051, 1.052, 1.053, 1.054, 1.055, 1.056, 1.057, 1.058, 1.059, 1.06, 1.061, 1.062, 1.063, 1.064, 1.065, 1.066, 1.067, 1.068, 1.069, 1.07, 1.071, 1.072, 1.073, 1.074, 1.075, 1.076, 1.077, 1.078, 1.079, 1.08, 1.081, 1.082, 1.083, 1.084, 1.085, 1.086, 1.087, 1.088, 1.089, 1.09, 1.091, 1.092, 1.093, 1.094, 1.095, 1.096, 1.097, 1.098, 1.099, 1.1, 1.11, 1.12, 1.13, 1.14, 1.15, 1.16, 1.17, 1.18, 1.19, 1.2, 1.21, 1.22, 1.23, 1.24, 1.25, 1.26, 1.27, 1.28, 1.29, 1.3, 1.31, 1.32, 1.33, 1.34, 1.35, 1.36, 1.37, 1.38, 1.39, 1.4, 1.41, 1.42, 1.43, 1.44, 1.45, 1.46, 1.47, 1.48, 1.49, 1.5, 1.51, 1.52, 1.53, 1.54, 1.55, 1.56, 1.57, 1.58, 1.59, 1.6, 1.61, 1.62, 1.63, 1.64, 1.65, 1.66, 1.67, 1.68, 1.69, 1.7, 1.71, 1.72, 1.73, 1.74, 1.75, 1.76, 1.77, 1.78, 1.79, 1.8, 1.81, 1.82, 1.83, 1.84, 1.85, 1.86, 1.87, 1.88, 1.89, 1.9, 1.91, 1.92, 1.93, 1.94, 1.95, 1.96, 1.97, 1.98 and 1.99.

The disclosed scintillators display luminescence in blue-green region of visible light when excited with X-rays and exhibit a comparable energy resolution to that exhibited by NaI and CsI scintillators. For example, scintillators having the formula $La_xY_{2-x}O_3$ are stable and have luminescence decay lifetimes of approximately 300 ps. As such, the use of the disclosed scintillators provides a means for detection of radiation.

The disclosed scintillators upon excitation emit electromagnetic radiation. The term "photoluminescence" refers to electromagnetic radiation emitted when UV light is used as a source of excitation. X-ray induced optical luminescence and X-ray fluorescence is emission under X-ray excitation.

The scintillators when prepared can have a particle size of from about 0.1 nm to about 500 nm. In one embodiment the disclosed scintillators are formed into a glass having a thickness and configuration determined by the formulator. The resulting glass can be adapted for use in the methods and devices described herein.

Example 1

The disclosed $La_xY_{2-x}O_3$ nanomaterials are synthesized using a solid state reaction. First, yttrium oxide ($Y_2O_3$) powder and lanthanum nitrate hydrate ($La(NO_3)_3 \cdot 6H_2O$) are admixed and stirred in ethanol for 24 hours. The amount of $Y_2O_3$ and $La(NO_3)_3 \cdot 6H_2O$ which is used is dependent upon the desired stoichiometry of the final scintillator, i.e., the value of "x" in the general formula, $La_xY_{2-x}O_3$. After stirring is complete, the mixture is then dried and calcined at 1100° C. for 10 hours to obtain the desired scintillator in the form of nanocrystals.

The formation of the disclosed scintillators into a glass can be accomplished as follows. The nanomaterial prepared above is charged to a crucible and calcined at 1500° C. for 2 hours. The resulting melt is poured into a mold and slowly cooled to room temperature. The resulting glass can be cut into any shape desired by the formulator. One example of a disclosed scintillator as a glass, $La_{0.2}Y_{1.8}O_3$, is used to demonstrate the scintillation luminescence depicted below.

TABLE I provides examples of the disclosed scintillators and their photoluminescence and X-ray induced emission.

TABLE I

| Scintillator | Photo emission | X-ray emission |
| --- | --- | --- |
| $La_{0.05}Y_{1.95}O_3$ | 450 nm | 455 nm |
| $La_{0.2}Y_{1.8}O_3$ | 432 nm | 445 nm |
| $La_{0.3}Y_{1.7}O_3$ | 436 nm | 440 nm |

Figure 2:
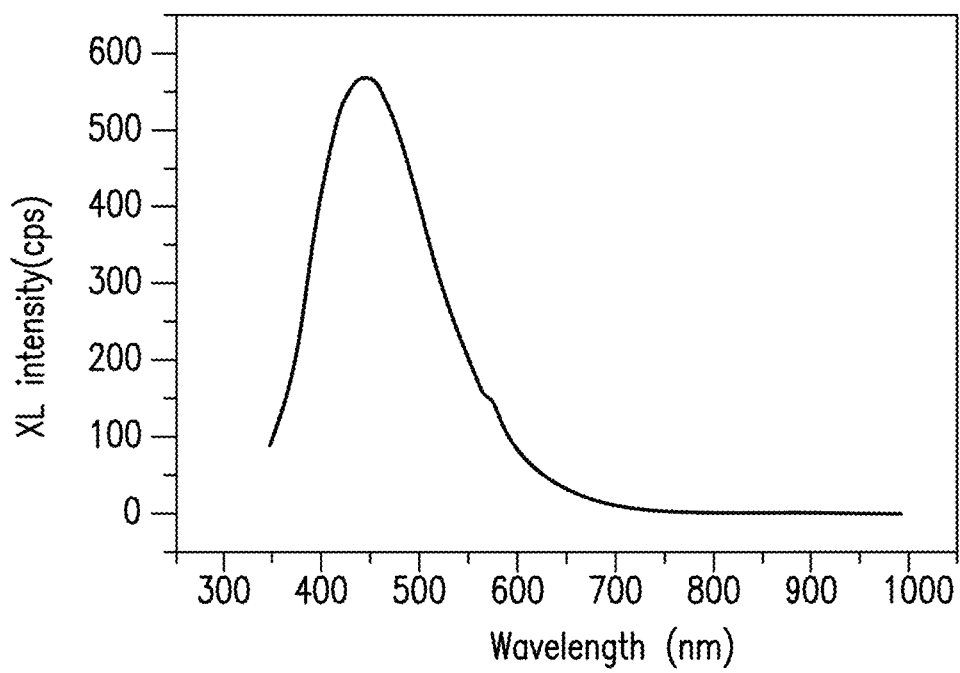
FIG. 2 depicts the X-ray excited luminescence of $La_{0.2}Y_{1.8}O_3$.

FIG. 2 depicts the X-ray induced luminescence of an example of the disclosed scintillators having the formula $La_xY_{2-x}O_3$. As seen in FIG. 2 the emission spectrum of $La_{0.2}Y_{1.8}O_3$ is centered at approximately 460 nm with an intensity of approximately 580 counts per second. Without wishing to be limited by theory, these emissions are believed to result from defects or electron-hole pairs or donor-acceptor pairs in the crystals. As such, the disclosed scintillators can be used for radiation detection, including alpha radiation, beta radiation, gamma radiation, neutron radiation, cosmic rays, and the like. In addition, the disclosed scintillators can be used for medical imaging, for example, X-ray intensification, detectors for computed tomography (CT), position-emission tomography (PET) and computed radiography (CR). Further, the disclosed scintillators can be used for cathodoluminescence induced by electron beams for monitor screens, including televisions, computers, and any displays related to cathodoluminescence or electron beams.

The formation of the disclosed scintillators into a glass can be accomplished as follows. The nanomaterial prepared above is charged to a crucible and calcined at 1500° C. for 2 hours. The resulting melt is poured into a mold and slowly cooled to room temperature. The resulting glass can be cut into any shape desired by the formulator. One example of a disclosed scintillator as a glass, $La_{0.2}Y_{1.8}O_3$, is used to demonstrate the scintillation luminescence depicted below. TABLE I provides the energy resolution and detection efficiency of an example of a disclosed scintillator, $La_{0.2}Y_{1.8}O_3$ when exposed to various sources of radioactivity.

FIG. 1 depicts glass samples prepared at 1100° C. using nanoparticle powders comprising $La_{0.2}Y_{1.8}O_3$ and the TEM images of the sample. This glass sample was prepared using nanoparticle having an average size of approximately 50 nm. Both the nanoparticle powder and the glass samples were shown to have intense X-ray excited luminescence.

Figure 3:
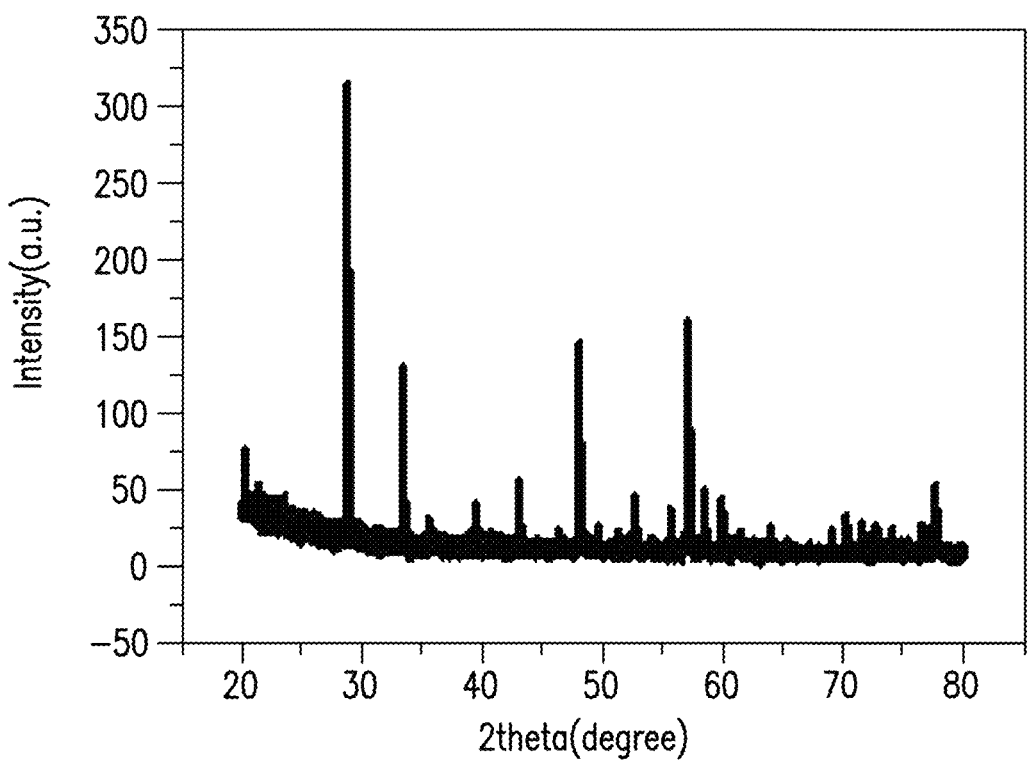
FIG. 3 depicts the X-ray diffraction (XRD) of $La_{0.2}Y_{1.8}O_3$.
Figure 4:
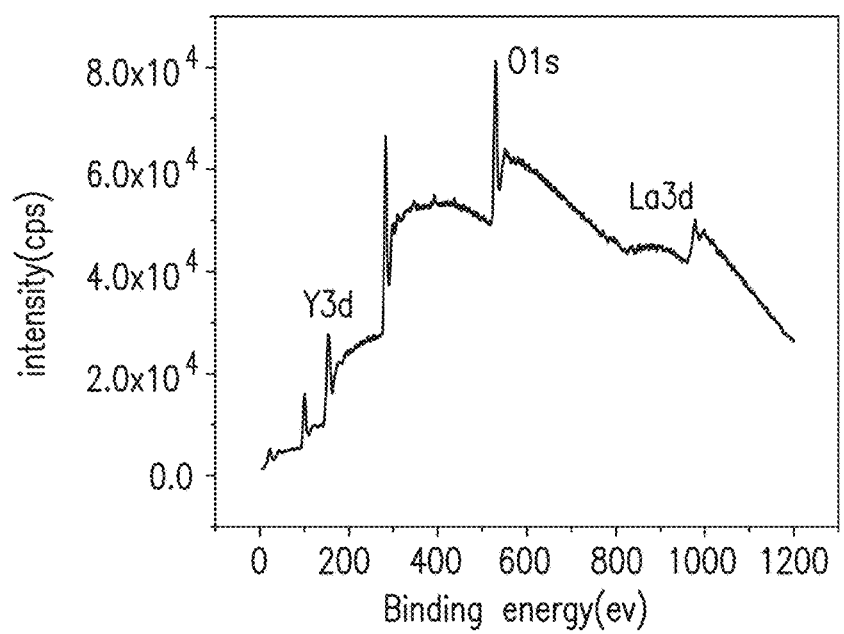
FIG. 4 depicts the X-ray photoelectron spectroscopy (XPS) of $La_{0.2}Y_{1.8}O_3$.

As depicted in FIG. 2, when the disclosed scintillators are prepared in the form of a glass and subjected to gamma radiation, photopeaks are detected. FIG. 3 shows the X-ray diffraction (XRD) pattern of a disclosed scintillator, $La_{0.2}Y_{1.8}O_3$, that has been formed into a glass. FIG. 4 shows X-ray photoelectron spectrum (XPS) of the same sample. The XRD pattern indicates that the material is well crystallized and the peaks correspond to the cubic $Y_2O_3$ phase, with no additional phases present. This means that $La_2O_3$ is completely dissolved in $Y_2O_3$ when heated at temperatures higher than 1100° C. The XPS confirms the presence of La, Y and O.

Figure 5:
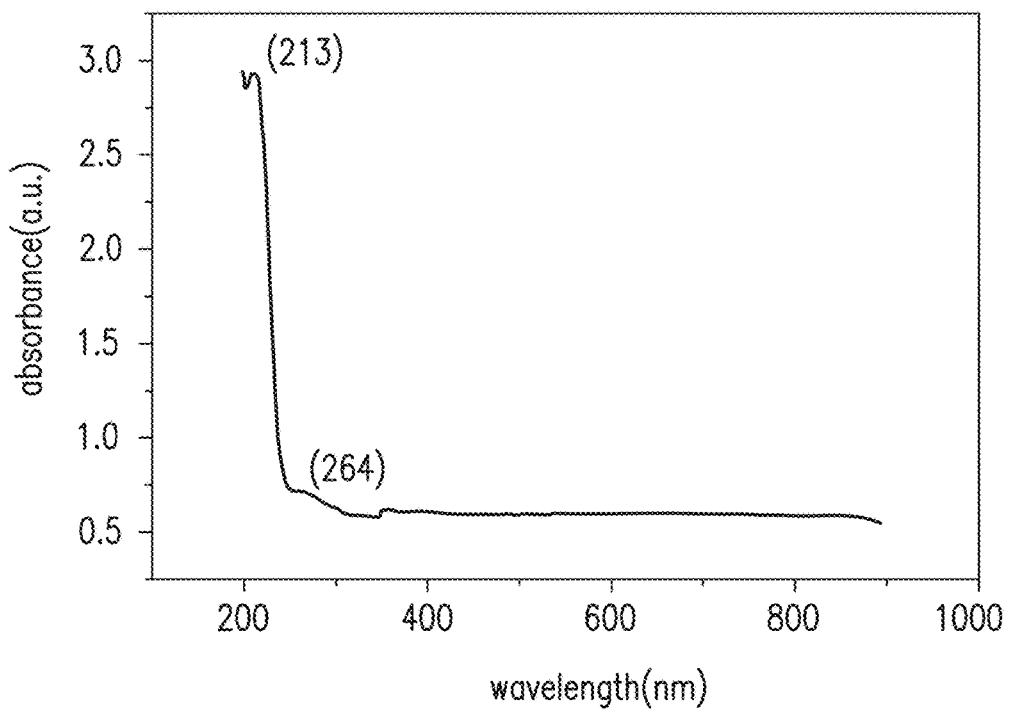
FIG. 5 depicts the absorption spectrum of $La_{0.2}Y_{1.8}O_3$.
Figure 6:
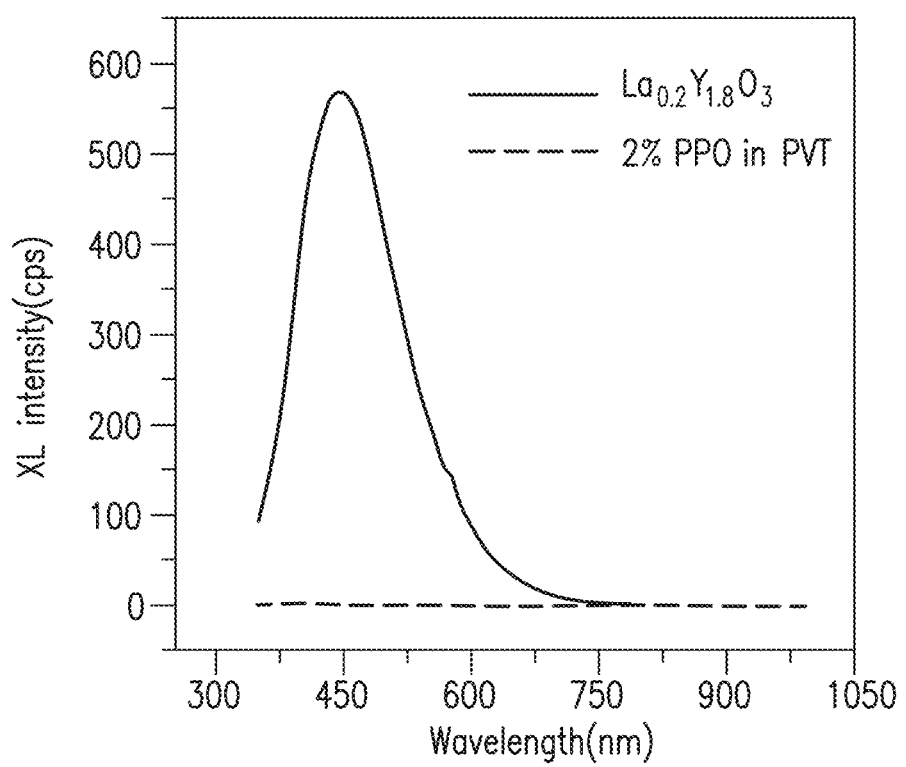
FIG. 6 depicts the X-ray excited emission spectra of $La_{0.2}Y_{1.8}O_3$ and 2% 2,5-diphenyloxazole in polyvinyl toluene.

This sample is transparent and its absorption spectrum is shown in FIG. 5. The $La_{0.2}Y_{1.8}O_3$ glass sample shows an absorption edge at around 240 nm and a peak at 213 nm. As shown in FIG. 6, the X-ray excited luminescence of $La_{0.2}Y_{1.8}O_3$ glass is more than 110 times that of PVT/PPO (2% PPO) of about the same dimension. All these characteristics indicate that $La_{0.2}Y_{1.8}O_3$ is a good scintillator for radiation detection.

Figure 7A:
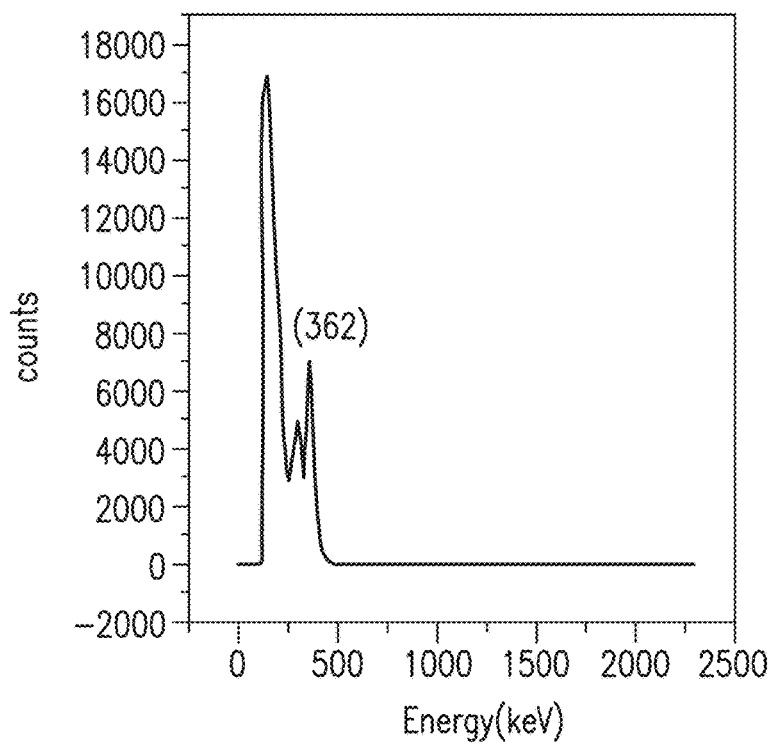
FIGS. 7A and 7B depict the energy calibration curve for 1 µCi Ba 133 source with energy resolution of 4.97% (FIG. 7A) and for 1 µCi Na-22 with energy resolution of 4.55% (FIG. 7B). Total number of counts is 12 cps (FIG. 7A) and 15 cps (FIG. 7B).
Figure 7B:
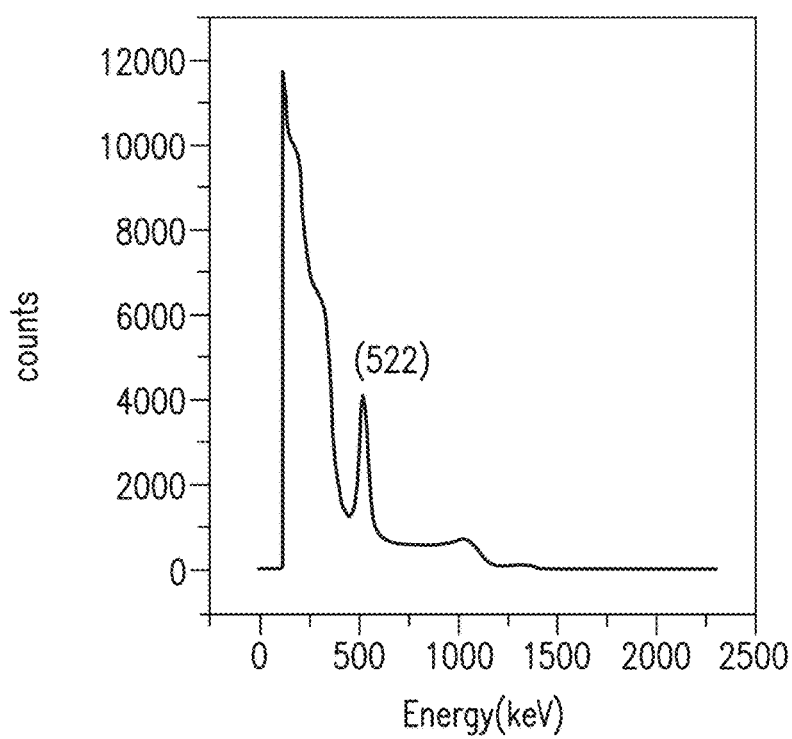
Figure 8A:
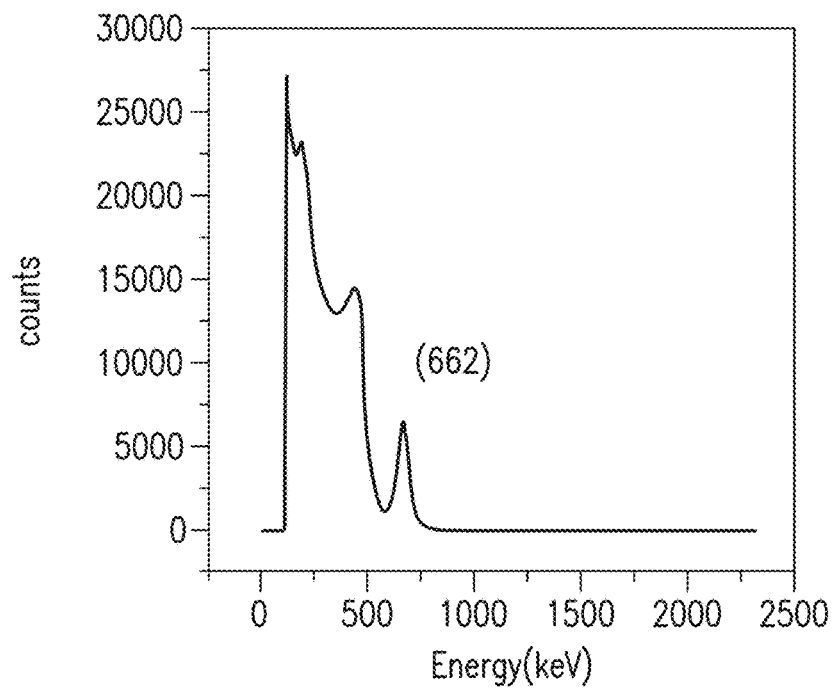
FIGS. 8A-8F depict the energy spectra of $La_{0.2}Y_{1.8}O_3$ tested with Cs-137 (FIG. 8A) and Co-60 (FIG. 8B), NaI tested with Cs-137 (FIG. 8C) and Co-60 (FIG. 8D), and CsI tested with Cs-137 (FIG. 8E) and Co-60 (FIG. 8F).
Figure 8B:
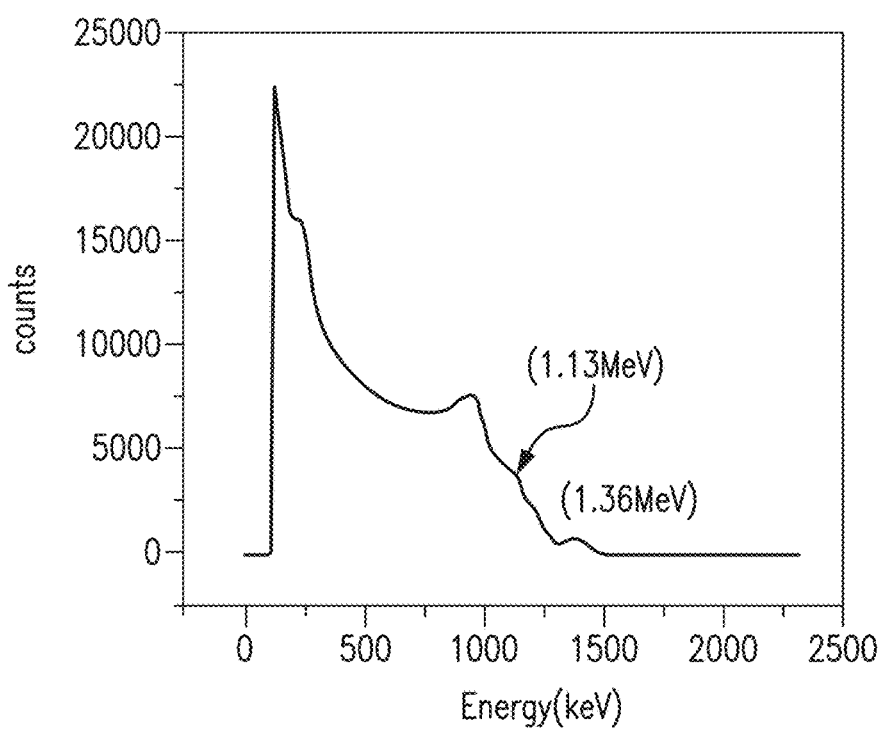
Figure 8C:
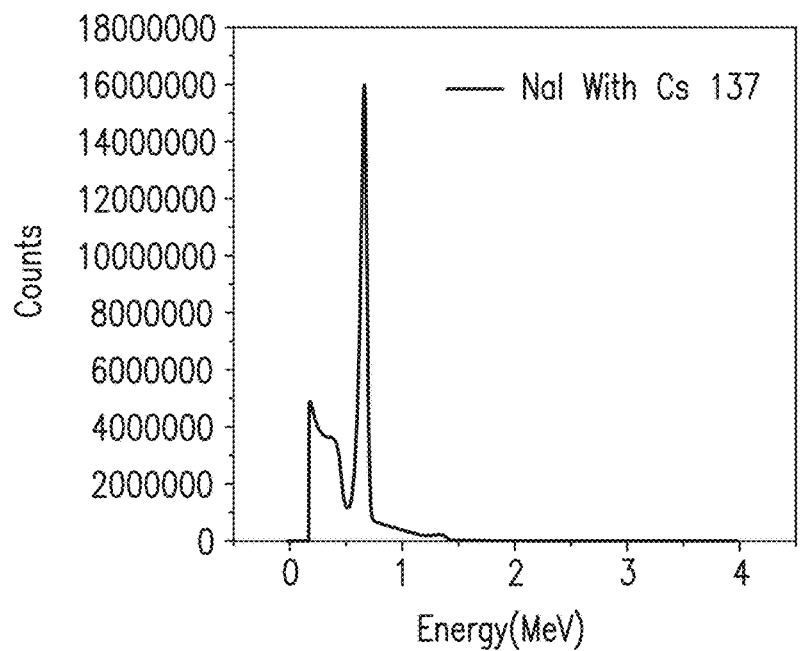
Figure 8D:
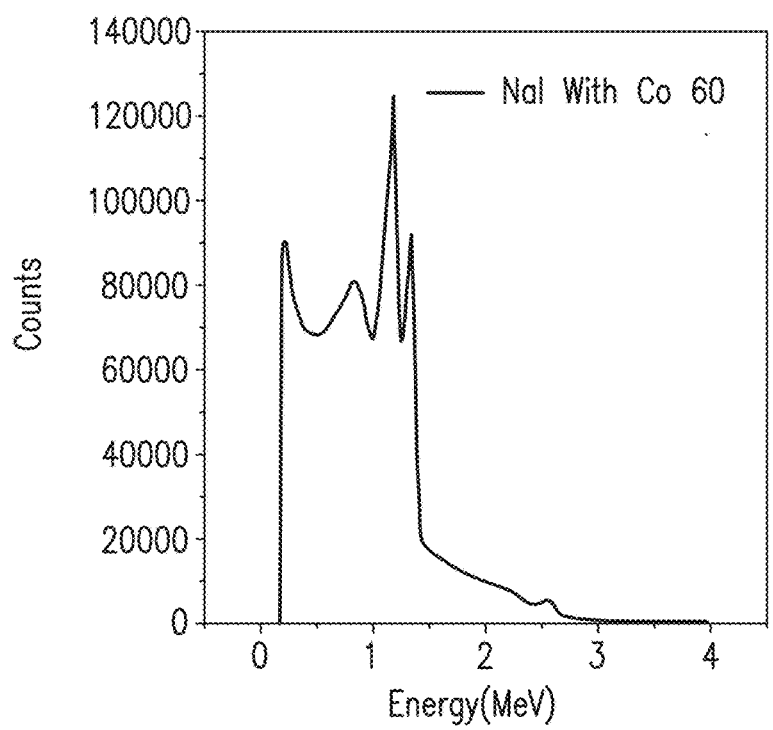
Figure 8E:
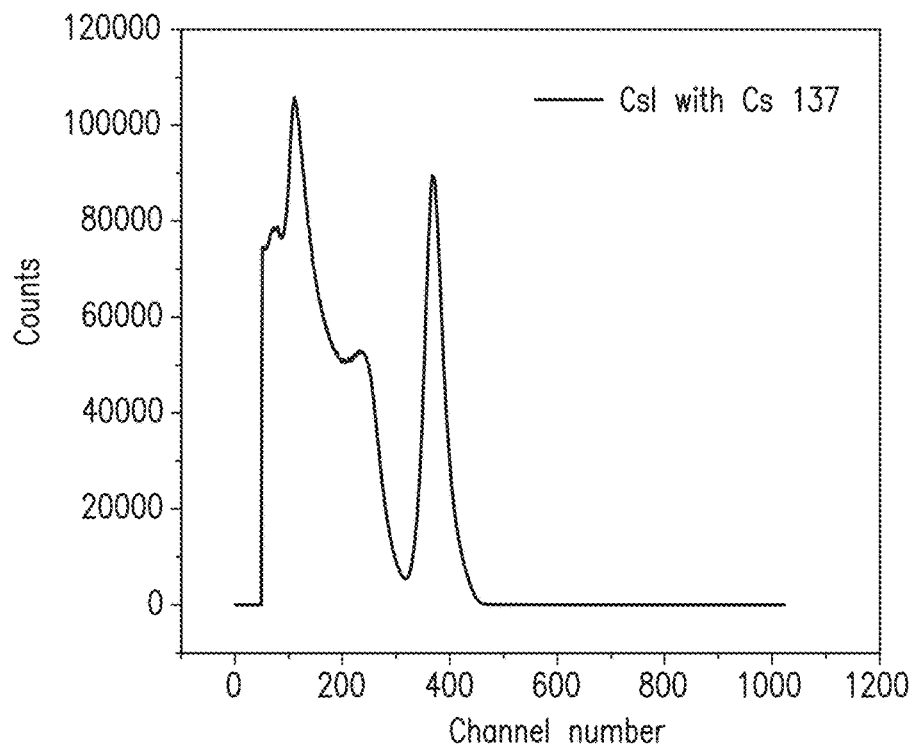
Figure 8F:
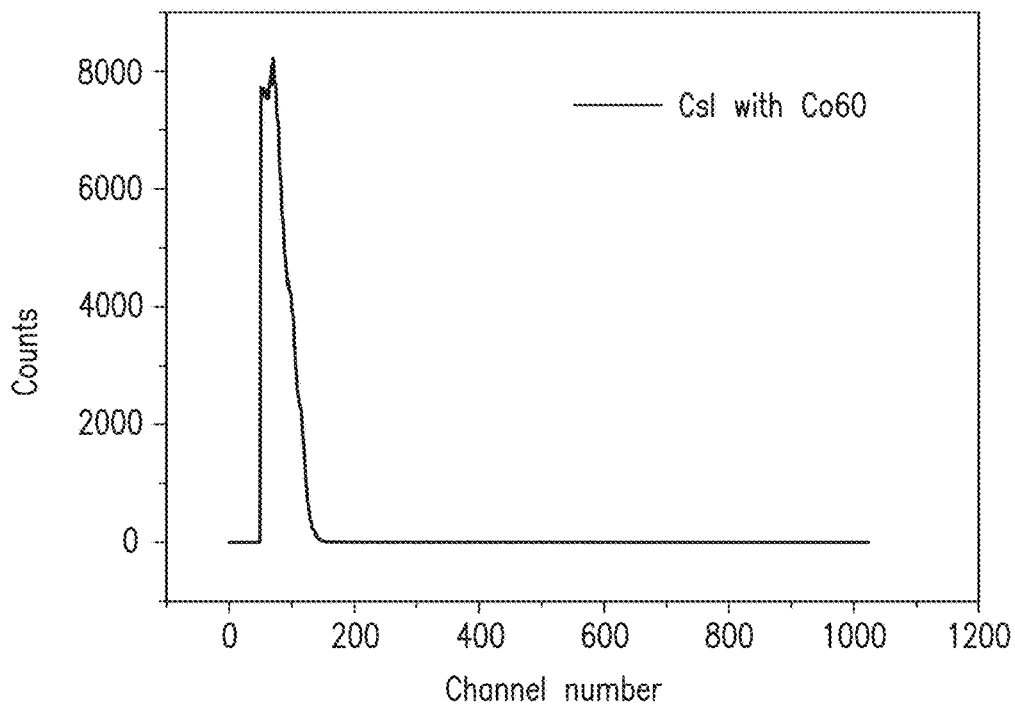
Figure 9:
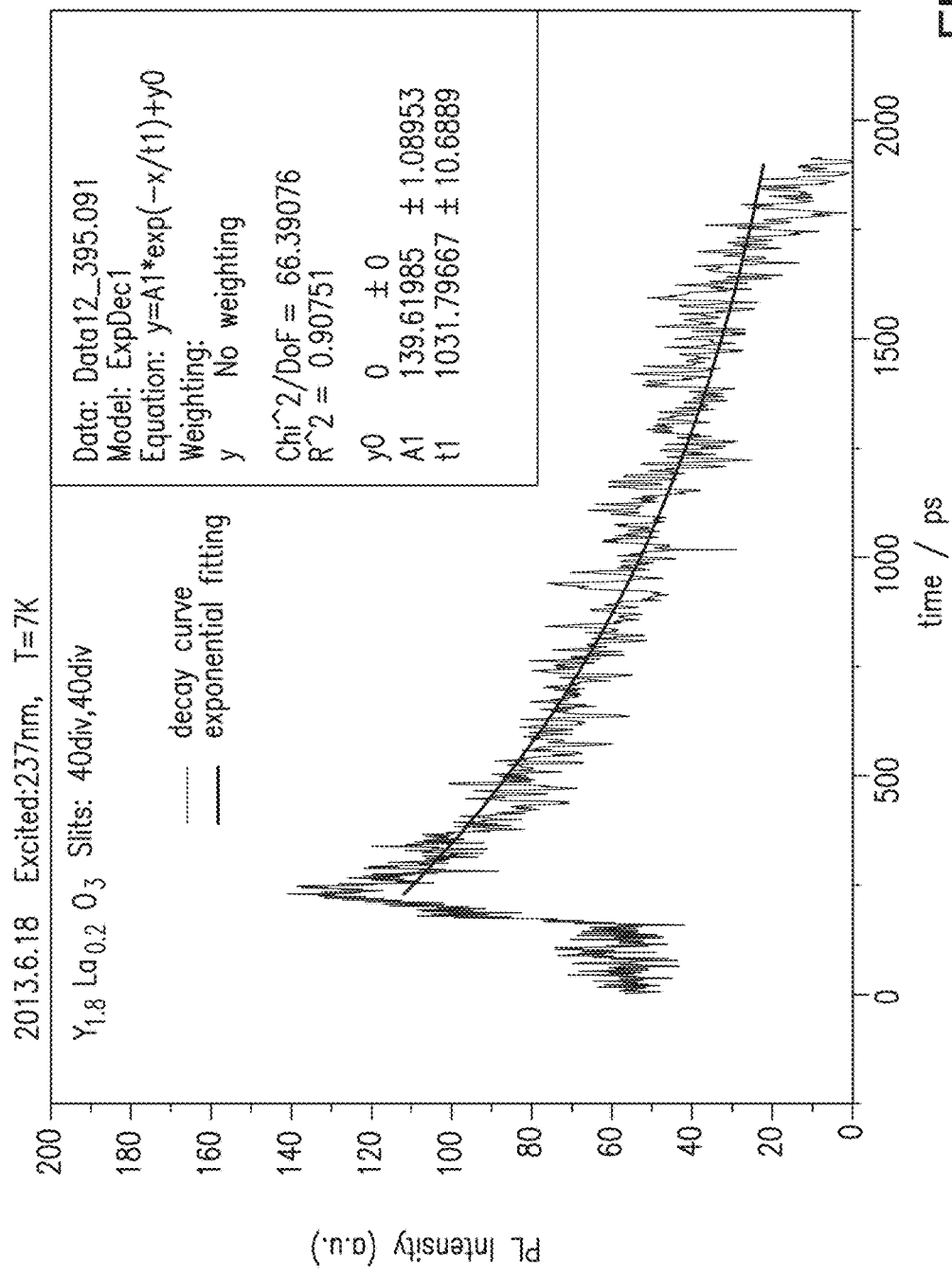
FIG. 9 depicts the luminescence decay curve of a $La_{0.2}Y_{1.8}O_3$ glass sample.
Figure 10A:
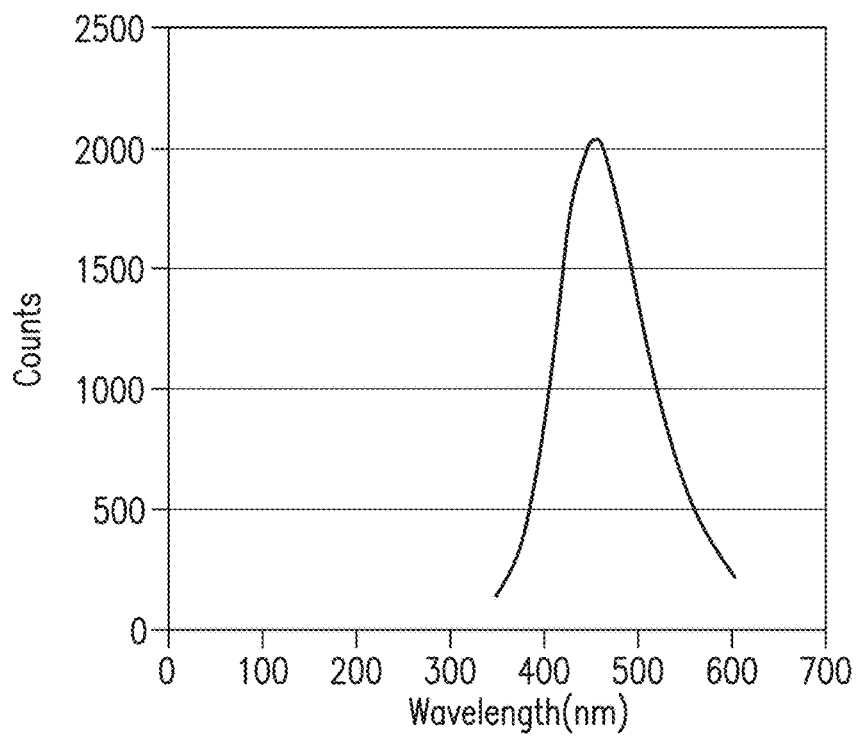
FIG. 10A is the X-ray excited luminescence of $La_{0.05}Y_{1.95}O_3$
Figure 10B:
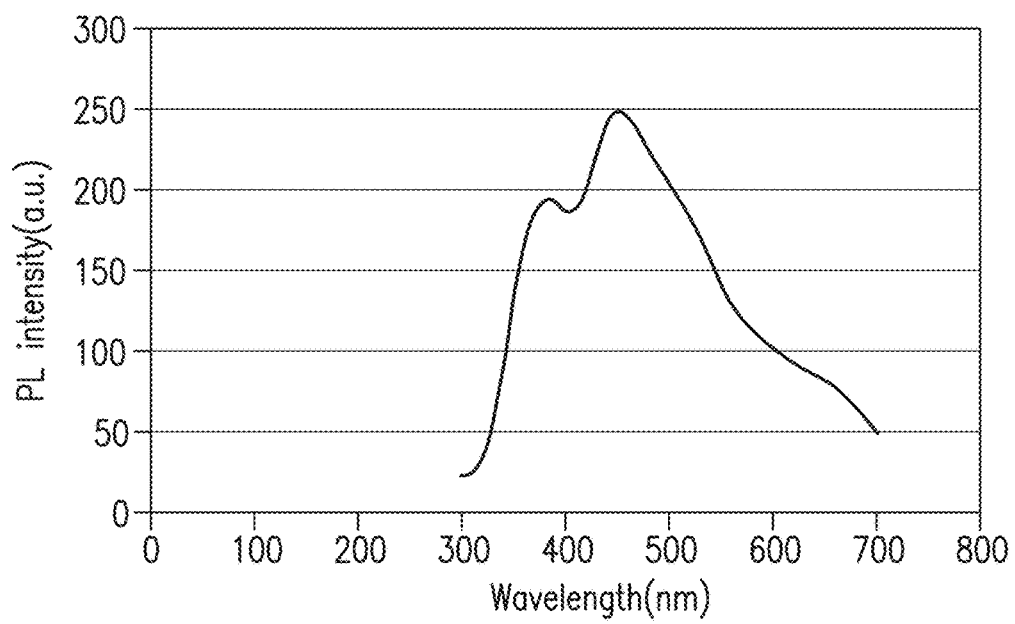
FIG. 10B is the U.V. photoluminescence of $La_{0.05}Y_{1.95}O_3$.
Figure 11A:
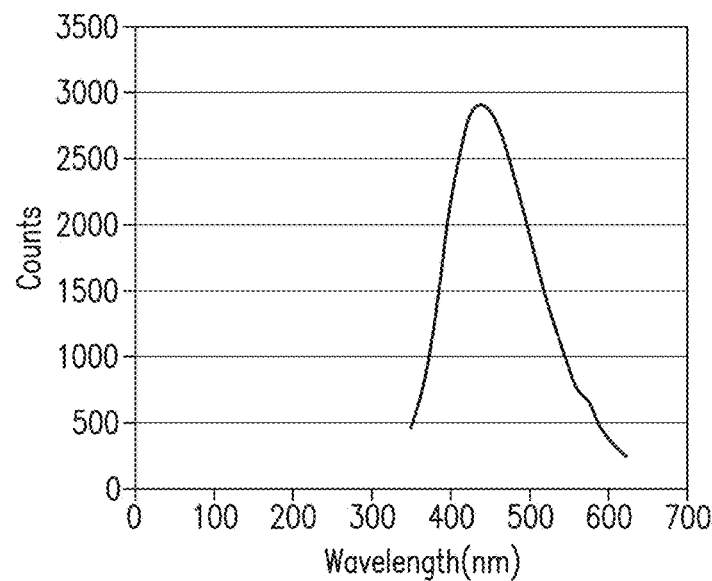
FIG. 11A is the X-ray excited luminescence of $La_{0.3}Y_{1.7}O_3$
Figure 11B:
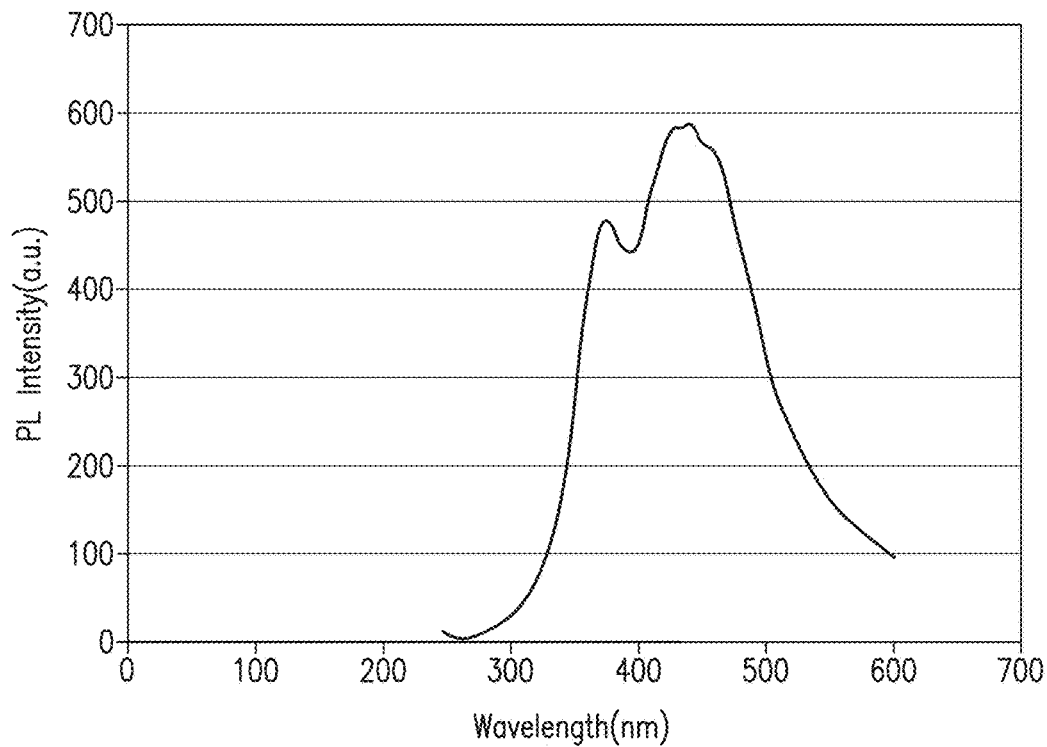
FIG. 11B is the photoluminescence of $La_{0.3}Y_{1.7}O_3$.

Tables 1 and 2 below, as well as the spectra shown FIG. 7A and FIG. 7B demonstrate that this example of a disclosed scintillator, $La_{0.2}Y_{1.8}O_3$, demonstrates scintillation properties, particularly for low energy isotopes like Ba-133 and Na-22. For Cs-137, Ba-133 and Ba-22, $La_{0.2}Y_{1.8}O_3$ sharp photopeaks are observed. The energy resolution and detector efficiency were calculated and shown the legends for FIG. 7A and FIG. 7B. For $La_{0.2}Y_{1.8}O_3$, NaI, and CsI tested with Cs-137 and Co-60 (FIGS. 8A-8F), the values are as follows. The $La_{0.2}Y_{1.8}O_3$ sample tested had a volume of 0.07 $cm^3$. The energy resolution for 5 µCi Cs-137 was 4.30% and the total number of counts is 37 cps (FIG. 8A). The photo peaks for 1 µCi Co-60 are not seen clearly, but bumps around 1.13 MeV and 1.36 MeV are detected (FIG. 8B). Total number of counts is 50 cps. The NaI sample tested had a volume of 16.4 $cm^3$. The energy resolution of the 0.662 MeV peak with Cs-137 is 4.14% and total counts is 12125 cps (FIG. 8C). The energy resolution of the 1.17 MeV peak with Co-60 is 8.1% and that of the 1.33 MeV is 4.02% (FIG. 8D). Total number of counts is 14936 cps. The CsI sample tested had a volume of 1 $cm^3$. The energy resolution with Cs-137 was 4.57% and total number of counts was 227 cps (FIG. 8E). The total number of counts with Co-60 was 21 cps (FIG. 8F). $La_{0.2}Y_{1.8}O_3$ has an energy resolution comparable to that of CsI and NaI scintillators.

TABLE II provides the energy resolution and detection efficiency of an example of a disclosed scintillator, $La_{0.2}Y_{1.8}O_3$ when exposed to various sources of radioactivity.

TABLE II

| Source | energy (keV) | counts/sec | energy resolution (%) | Detection efficiency (%) |
|---|---|---|---|---|
| $^{137}Cs$ | 622 | 36.55 | 4.30 | 0.023 |
| $^{60}Co$ | 1173 & 1332 | 12.79 | — | 0.017 |
| $^{60}Co^1$ | 1173 & 1332 | 49.18 | — | 0.017 |
| $^{22}Na$ | 511 | 14.58 | 4.55 | 0.039 |
| $^{133}Ba^2$ | 356 | 11.13 | 4.97 | 0.069 |
| $^{133}Ba^3$ | 356 | 10.63 | 5.79 | 0.034 |
| $^{133}Ba^4$ | 356 | 44.99 | 5.30 | 0.036 |

[1] four sources
[2] without reflector
[3] with reflector
[4] four sources

TABLE III compares the energy resolution and detector efficiency of a disclosed scintillator with scintillators cesium iodide (CsI) and sodium iodide (NaI) using different sources of radiation.

TABLE III

| Scintillator | energy (keV) | counts/sec | energy resolution (%) | Detection efficiency (%) |
|---|---|---|---|---|
| Radiation source $^{137}Cs$ | | | | |
| $La_{0.2}Y_{1.8}O_3$ | 622 | 37 | 4.30 | 0.023 |
| CsI | 622 | 227 | 4.57 | 0.18 |
| NaI | 622 | 12125 | 4.14 | 9.64 |
| Radiation source $^{60}Co$ | | | | |
| $La_{0.2}Y_{1.8}O_3$ | 1173 & 1332 | 50 | — | 0.017 |
| CsI | 1173 & 1332 | 21 | — | 0.028 |
| NaI | 1173 & 1332 | 14936 | 4.02 | 5.05 |

2. Methods

Disclosed herein are methods for detecting a source of radiation emitted from a radioactive element. Specifically The disclosure relates to lanthanum-yttrium oxide scintillators used for detecting radiation, such as X-rays, gamma rays, beta-rays, protons, electrons, and thermal neutron radiation and charged particles. The scintillators can be used for in security, medical imaging, particle physics, space, soil, and other applications.

In one aspect disclosed is a method for detecting the presence of a radioactive element or a source of radiation, comprising:

a) receiving radiation from a radiation source, the radiation impinging upon a scintillator having the formula:

$A_xB_{2-x}O_3$ wherein A is chosen from La, Y, Lu or Sc;
B is chosen from La, Y, Lu or Sc;

provided that A and B are not the same element;
the index x is greater than 0 and less than 2 (0<x<2);
wherein the impinging radiation causes the scintillator to emit electromagnetic radiation; and
b) measuring the resulting electromagnetic emission.

In a further aspect disclosed is a method for detecting the presence of a radioactive element or a source of radiation, comprising:
a) receiving radiation from an ultraviolet radiation source, the radiation impinging upon a scintillator having the formula:

$A_xB_{2-x}O_3$ wherein A is chosen from La, Y, Lu or Sc;
B is chosen from La, Y, Lu or Sc;
provided that A and B are not the same element;
the index x is greater than 0 and less than 2 (0<x<2);
wherein the impinging radiation causes photoluminescence; and
b) measuring the resulting photoluminescence.

In a yet further aspect disclosed is a method for detecting the presence of a radioactive element or a source of radiation, comprising:
a) receiving X-rays from an X-ray source, the X-rays impinging upon a scintillator having the formula:

$A_xB_{2-x}O_3$ wherein A is chosen from La, Y, Lu or Sc;
B is chosen from La, Y, Lu or Sc;
provided that A and B are not the same element;
the index x is greater than 0 and less than 2 (0<x<2);
wherein the impinging radiation causes the X-ray induced luminescence or fluorescence; and
b) measuring the resulting luminescence or fluorescence.

By the term "measuring" is meant either quantifying, qualifying the photoluminescence or providing both types of measurements. The wavelength of the emitted electromagnetic radiation can be used to qualify the source of radiation, for example, to correlate the wavelength of the emission with a particular source of radiation. Alternatively, the intensity of the emission can be used to quantify the amount of radiation being received. The formulator can therefore utilize the disclosed scintillators to identify the source of the radiation, for example, the element or elements producing the radiation, as well as the relative amounts of each.

The term "impinge" and its various forms means to contact, strike, hit, collide with or otherwise make contact. For example, radiation impinges the scintillator when the radiation makes contact with the scintillator.

The term "electromagnetic radiation" as meant herein is used in the accepted scientific definition. An example of electromagnetic radiation includes visible light which is one resultant of photoluminescence.

In a further aspect disclosed is a method for detecting the presence of a source of radiation, comprising:
a) receiving radiation from a radiation source, the radiation impinging upon a scintillator comprising $La_{0.2}Y_{1.8}O_3$, wherein the impinging radiation causes the scintillator to photoluminescence; and
b) measuring the resulting photoluminescence.

In one embodiment of this aspect the method comprises:
a) receiving X-rays from a source of X-rays, the X-rays impinging upon a scintillator comprising $La_{0.2}Y_{1.8}O_3$, wherein the impinging X-rays cause the scintillator to emit X-ray induced optical luminescence or X-ray fluorescence; and b) measuring the resulting X-ray induced optical luminescence or X-ray fluorescence.

The photoluminescence can be measured, quantified or qualified by any means chosen by the formulator. See Resch-Genger et al., "Characterization of photoluminescence measuring systems (IUPAC Technical Report)," *Pure Appl. Chem.*, Vol. 84, No. 8, pp. 1815-1835, (2012) for a discussion of photoluminescence detection.

3. Devices

Further disclosed herein is a device for detecting the presence of radiation, comprising:
a) a scintillator having the formula:

$A_xB_{2-x}O_3$ wherein A is chosen from La, Y, Lu or Sc;
B is chosen from La, Y, Lu or Sc;
provided that A and B are not the same element;
the index x is greater than 0 and less than 2 (0<x<2); and
b) a detector for receiving emitted electromagnetic radiation.

In one aspect the scintillator is fabricated into a thin transparent or translucent glass onto which radiation impinges. The glass is configured with a detector which detects any electromagnetic radiation that is emitted by the scintillator and which is used to verify the presence of a radiation source. The electromagnetic radiation emitted by the scintillator can be photoluminescence, X-ray induced optical luminescence or X-ray fluorescence.

Also disclosed herein is the use of the disclosed scintillators for detecting the presence of suspected radiation. For example, within a security setting, a person trying to transport a source of radiation can be detected using the disclosed scintillators. In addition, cargo containers, packages, and the like can be examined for a hidden source of radiation.

Other advantages which are obvious and which are inherent to the invention will be evident to one skilled in the art. It will be understood that certain features and sub-combinations are of utility and may be employed without reference to other features and sub-combinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

What is claimed is:

1. A method for detecting the presence of a radioactive element or a source of radiation, comprising:
a) receiving radiation from a radiation source, the radiation impinging upon a scintillator having the formula:

$A_xB_{2-x}O_3$ wherein A is an element chosen from La, Y, Lu or Sc;
B is an element chosen from La, Y, Lu or Sc;
provided that A and B are not the same element;
the index x is greater than 0 and less than 2 (0<x<2);
wherein the impinging radiation causes the scintillator to emit electromagnetic radiation; and
b) measuring the resulting electromagnetic emission.

2. The method according to claim 1, wherein the radiation impinging upon the scintillator is from an ultraviolet source and the electromagnetic emission is photoluminescence.

3. The method according to claim 1, wherein the radiation impinging upon the scintillator is from an X-ray source and the electromagnetic emission is X-ray induced luminescence or fluorescence.

4. The method according to claim 1, wherein the scintillator has the formula $La_xY_{2-x}O_3$.

5. The method according to claim 4, wherein the scintillator is chosen from $La_{0.05}Y_{1.95}O_3$, $La_{0.1}Y_{1.9}O_3$; $La_{0.2}Y_{1.8}O_3$; $La_{0.3}Y_{1.7}O_3$; $La_{0.4}Y_{1.6}O_3$; $La_{0.5}Y_{1.5}O_3$; and $La_{0.6}Y_{1.4}O_3$.

6. The method according to claim 1, wherein the scintillator has the formula $La_xSc_{2-x}O_3$.

7. The method according to claim 6, wherein the scintillator is chosen from $La_{0.05}Sc_{1.95}O_3$, $La_{0.1}Sc_{1.9}O_3$; $La_{0.2}Sc_{1.8}O_3$; $La_{0.3}Sc_{1.7}O_3$; $La_{0.4}Sc_{1.6}O_3$; $La_{0.5}Sc_{1.5}O_3$; and $La_{0.6}Sc_{1.4}O_3$.

8. The method according to claim 1, wherein the scintillator has the formula $La_xLu_{2-x}O_3$.

9. The method according to claim 8, wherein the scintillator is chosen from $La_{0.05}Lu_{1.95}O_3$, $La_{0.1}Lu_{1.9}O_3$; $La_{0.2}Lu_{1.8}O_3$; $La_{0.3}Lu_{1.7}O_3$; $La_{0.4}Lu_{1.6}O_3$; $La_{0.5}Lu_{1.5}O_3$; and $La_{0.6}Lu_{1.4}O_3$.

10. A method for detecting the presence of a source of radiation, comprising:
   a) receiving radiation from an ultraviolet radiation source, the radiation impinging upon a scintillator having the formula:

$A_xB_{2-x}O_3$ wherein A is chosen from La, Y, Lu or Sc;
   B is chosen from La, Y, Lu or Sc;
   provided that A and B are not the same element;
   the index x is greater than 0 and less than 2 ($0<x<2$);
   wherein the impinging radiation causes photoluminescence; and
   b) measuring the resulting photoluminescence.

11. The method according to claim 10, wherein the scintillator has the formula $La_xY_{2-x}O_3$.

12. The method according to claim 11, wherein the scintillator is chosen from $La_{0.05}Y_{1.95}O_3$, $La_{0.1}Y_{1.9}O_3$; $La_{0.2}Y_{1.8}O_3$; $La_{0.3}Y_{1.7}O_3$; $La_{0.4}Y_{1.6}O_3$; $La_{0.5}Y_{1.5}O_3$; and $La_{0.6}Y_{1.4}O_3$.

13. A device for detecting the presence of radiation, comprising:
   a) a scintillator having the formula:

$A_xB_{2-x}O_3$ wherein A is chosen from La, Y, Lu or Sc;
   B is chosen from La, Y, Lu or Sc;
   provided that A and B are not the same element;
   the index x is greater than 0 and less than 2 ($0<x<2$); and
   b) a detector for receiving emitted electromagnetic radiation.

14. The device according to claim 13, wherein the scintillator has the formula $La_xY_{2-x}O_3$.

15. The device according to claim 14, wherein the scintillator is chosen from $La_{0.05}Y_{1.95}O_3$, $La_{0.1}Y_{1.9}O_3$; $La_{0.2}Y_{1.8}O_3$; $La_{0.3}Y_{1.7}O_3$; $La_{0.4}Y_{1.6}O_3$; $La_{0.5}Y_{1.5}O_3$; and $La_{0.6}Y_{1.4}O_3$.

16. A method for detecting the presence of a radiation source, comprising:
   a) contacting a scintillator having the formula:

$A_xB_{2-x}O_3$ wherein A is chosen from La, Y, Lu or Sc;
   B is chosen from La, Y, Lu or Sc;
   provided that A and B are not the same element;
   the index x is greater than 0 and less than 2 ($0<x<2$) with a suspected source of radiation; and
   b) observing whether induced luminescence or X-ray fluorescence florescence occurs.

17. The method according to claim 16, wherein the scintillator has the formula $La_xY_{2-x}O_3$.

18. The method according to claim 17, wherein the scintillator is chosen from $La_{0.05}Y_{1.95}O_3$, $La_{0.1}Y_{1.9}O_3$; $La_{0.2}Y_{1.8}O_3$; $La_{0.3}Y_{1.7}O_3$; $La_{0.4}Y_{1.6}O_3$; $La_{0.5}Y_{1.5}O_3$; and $La_{0.6}Y_{1.4}O_3$.

19. The method according to claim 16, wherein the suspected radiation is in a container.

20. The method according to claim 16, wherein a person has possession of the suspected radiation.

* * * * *